United States Patent
James et al.

(10) Patent No.: US 10,728,317 B1
(45) Date of Patent: Jul. 28, 2020

(54) USAGE-BASED SERVER LOAD BALANCING

(71) Applicant: Verizon Patent and Licensing Inc., Arlington, VA (US)

(72) Inventors: Matthew W. James, Austin, TX (US); Joseph B. Knaack, Cedar Park, TX (US); David Holtfrerich, Round Rock, TX (US); Lei Lin, Austin, TX (US); Jessica Marie Lindee, Sunnyvale, CA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 0 days.

(21) Appl. No.: 16/272,706

(22) Filed: Feb. 11, 2019

(51) Int. Cl.
*H04L 29/06* (2006.01)
*H04L 29/08* (2006.01)
*H04W 4/10* (2009.01)

(52) U.S. Cl.
CPC ........ *H04L 67/1014* (2013.01); *H04L 67/101* (2013.01); *H04L 67/1023* (2013.01); *H04L 67/1044* (2013.01)

(58) Field of Classification Search
CPC  H04L 67/101; H04L 67/1023; H04L 67/1044
USPC .......................... 709/223, 224, 225, 226, 231
See application file for complete search history.

(56) References Cited

U.S. PATENT DOCUMENTS

| | | | | |
|---|---|---|---|---|
| 7,984,151 | B1* | 7/2011 | Raz | G06F 9/5083 709/223 |
| 9,219,705 | B2* | 12/2015 | Heinson | H04L 29/12066 |
| 10,432,709 | B2* | 10/2019 | Chang | H04L 67/1008 |
| 2005/0005006 | A1* | 1/2005 | Chauffour | H04L 67/1027 709/223 |
| 2014/0050083 | A1* | 2/2014 | Layman | H04L 12/56 370/230 |

OTHER PUBLICATIONS

"Cluster Topology Configuration of Subclusters, Nodes, and Users"—Cisco, Apr. 21, 2016 https://www.cisco.com/c/en/us/td/docs/voice_ip_comm/cucm/im_presence/configAdminGuide/9_0/CUP0_BK_CFF5B189_00_config-admin-guide-imp-90/CUP0_BK_CFF5B189_00_config-admin-guide-imp-90_chapter_011100.pdf (Year: 2016).*

* cited by examiner

*Primary Examiner* — Randy A Scott

(57) ABSTRACT

A load balancer determines a first usage load for a first server group that is one of a plurality of server groups associated with a resource. The load balancer determines a usage total for a user group of a plurality of user groups assigned to make requests for the resource via the first server group. The load balancer determines an assignment of the user group to make requests for the resource via the first server group or a second server group of the plurality of server groups based on the usage total of the user group, the first usage load of the first server group, and a second usage load of the second server group. The load balancer routes requests for the resource by the user group to the first server group or the second server group based on the assignment.

20 Claims, 7 Drawing Sheets

500

510 — Determine a first usage load for a first server group, wherein the first server group is one of a plurality of server groups associated with a resource, wherein the first usage load is an aggregate usage total of the first server group over a time period by a plurality of user groups assigned to make requests for the resource via the first server group 520 — Determine a usage total for a user group of the plurality of user groups assigned to make requests for the resource via the first server group, wherein the usage total identifies a usage of the first server group by the user group over the time period 530 — Determine an assignment of the user group to make requests for the resource via the first server group or a second server group of the plurality of server groups based on the usage total of the user group, the first usage load of the first server group, and a second usage load of the second server group 540 — Route requests for the resource by the user group to the first server group or the second server group based on the assignment

USAGE-BASED SERVER LOAD BALANCING

BACKGROUND

Load balancing can distribute workloads, such as requests to a web service, across multiple computing resources, such as computers, computer clusters, network links, central processing units, or disk drives. Load balancing can be performed by one or more load balancing techniques, such as a random choice technique, a round-robin technique, an Internet Protocol (IP) address hashing technique, a least connections technique, and/or the like.

BRIEF DESCRIPTION OF THE DRAWINGS

FIG. 5 is a flow chart of an example process for usage-based server load balancing.

DETAILED DESCRIPTION OF PREFERRED EMBODIMENTS

Figure 1A:
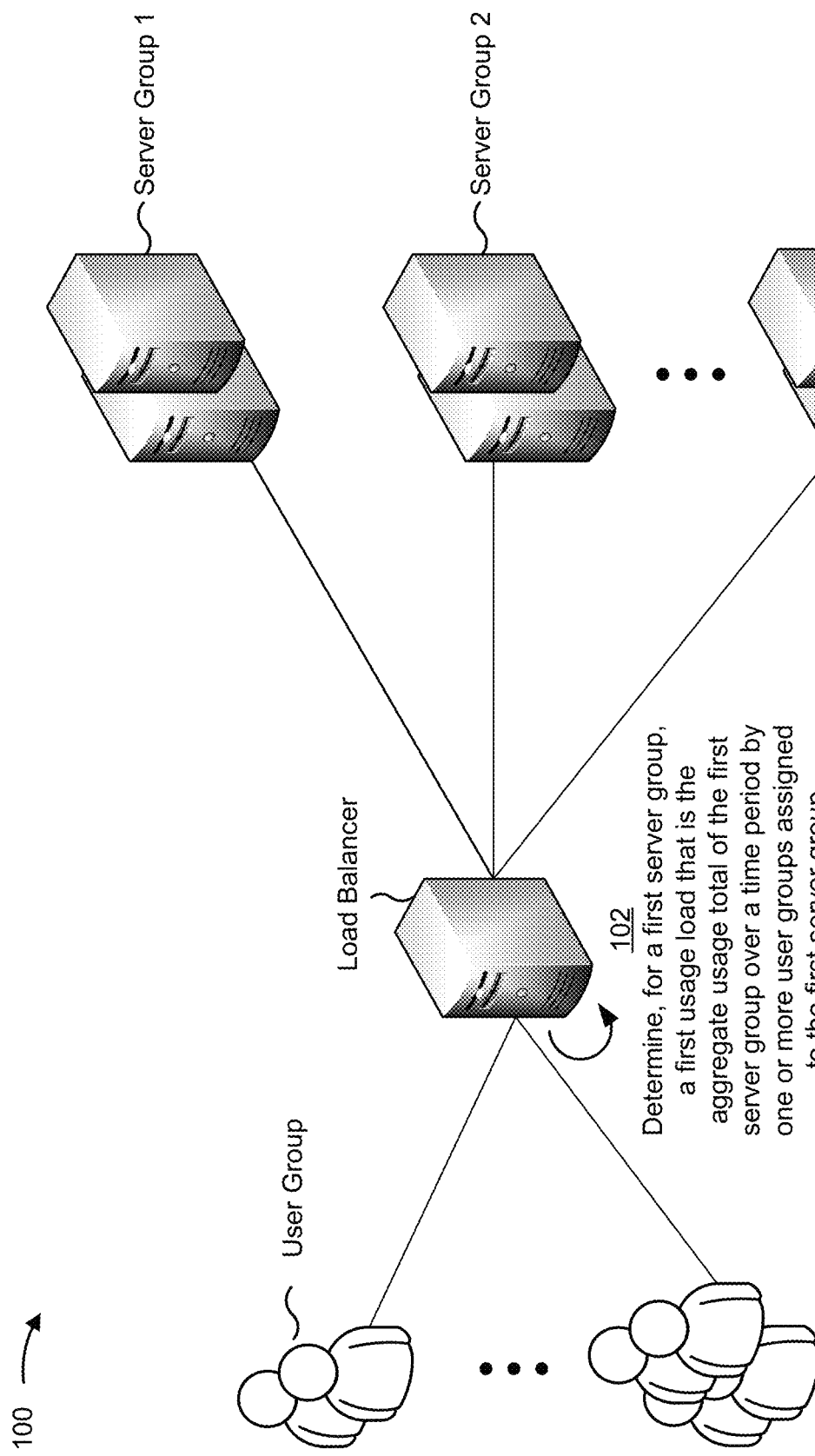
FIGS. 1A-1C are diagrams of one or more example implementations described herein.

The following detailed description of example implementations refers to the accompanying drawings. The same reference numbers in different drawings can identify the same or similar elements.

Requests for one or more resources can be distributed across multiple server groups (e.g., clusters of one or more server devices) by a load balancer, according to one or more criteria, to achieve an even distribution of requests across the server groups. Sometimes, the criteria employed by a load balancer results in an even distribution of users across the server groups. An even distribution of users can result in a balanced load when traffic produced among the users is substantially level, such that any one user makes a similar number, and a similar type, of requests as any other user. However, a problem can arise when traffic produced among the users varies.

In some situations, such as where requests are produced by groups of users, traffic can significantly vary between user groups. For example, requests to a web service can be made by a customer that can include one user, hundreds of users, thousands of users, etc. Furthermore, users of a customer can make requests to the web service using a single uniform resource locator (URL) associated with the customer, which can result in all requests of the customer being sent to a single server group according to conventional load balancing techniques (e.g., a URL hashing technique). Accordingly, conventional load balancing techniques can result in an uneven distribution of requests across the server groups, thereby underutilizing some server groups while overworking other server groups. Underutilizing a server group wastes computing resources (e.g., processing resources, memory resources, and/or the like), network resources, and/or power resources that the server group must consume during uptime even if the server group is idle or near-idle. In addition, overworking a server group can result in slow response times from the server group, greater unavailability of the server group, and more frequent crashing and downtime of the server group or a server device of the server group.

Some implementations described herein include a load balancer that determines an assignment for a user group to make requests to one or more resources via a server group based on a historical usage of the user group and a historical load on the server group. In this way, requests to the one or more resources can be distributed evenly across server groups according to actual usage data and/or load data so that server groups are not underutilized or overworked. As a result, requests to the one or more resources can be processed more reliably and with greater speed while reducing crashes and downtime of the server groups or a server device of the server groups. In addition, computing resources (e.g., processing resources, memory resources, and/or the like), network resources, and/or power resources that would otherwise be wasted by idle or near-idle server groups can be utilized to process requests, and thereby ease the processing burden of overworked server groups.

Figure 1B:
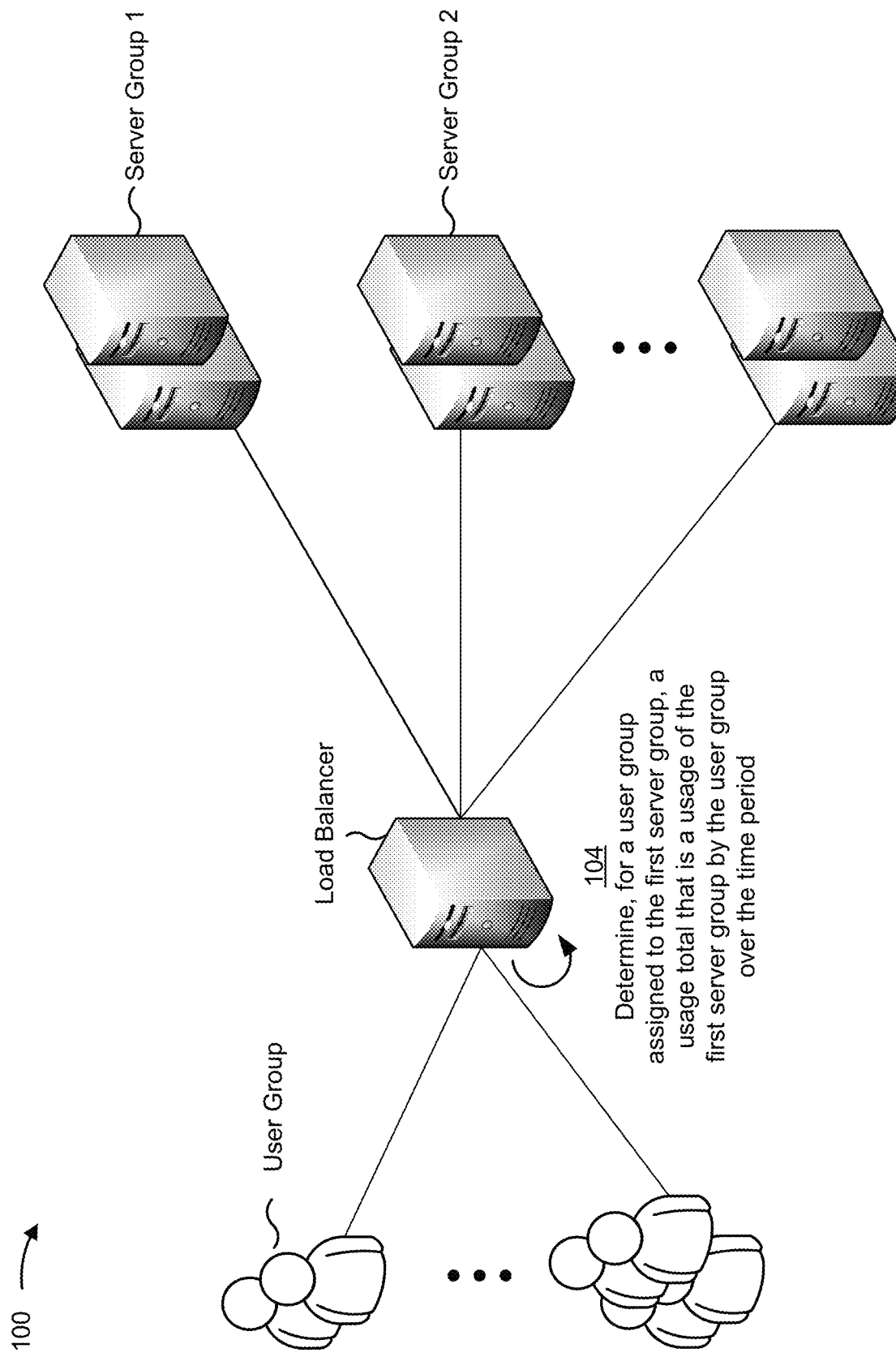
Figure 1C:
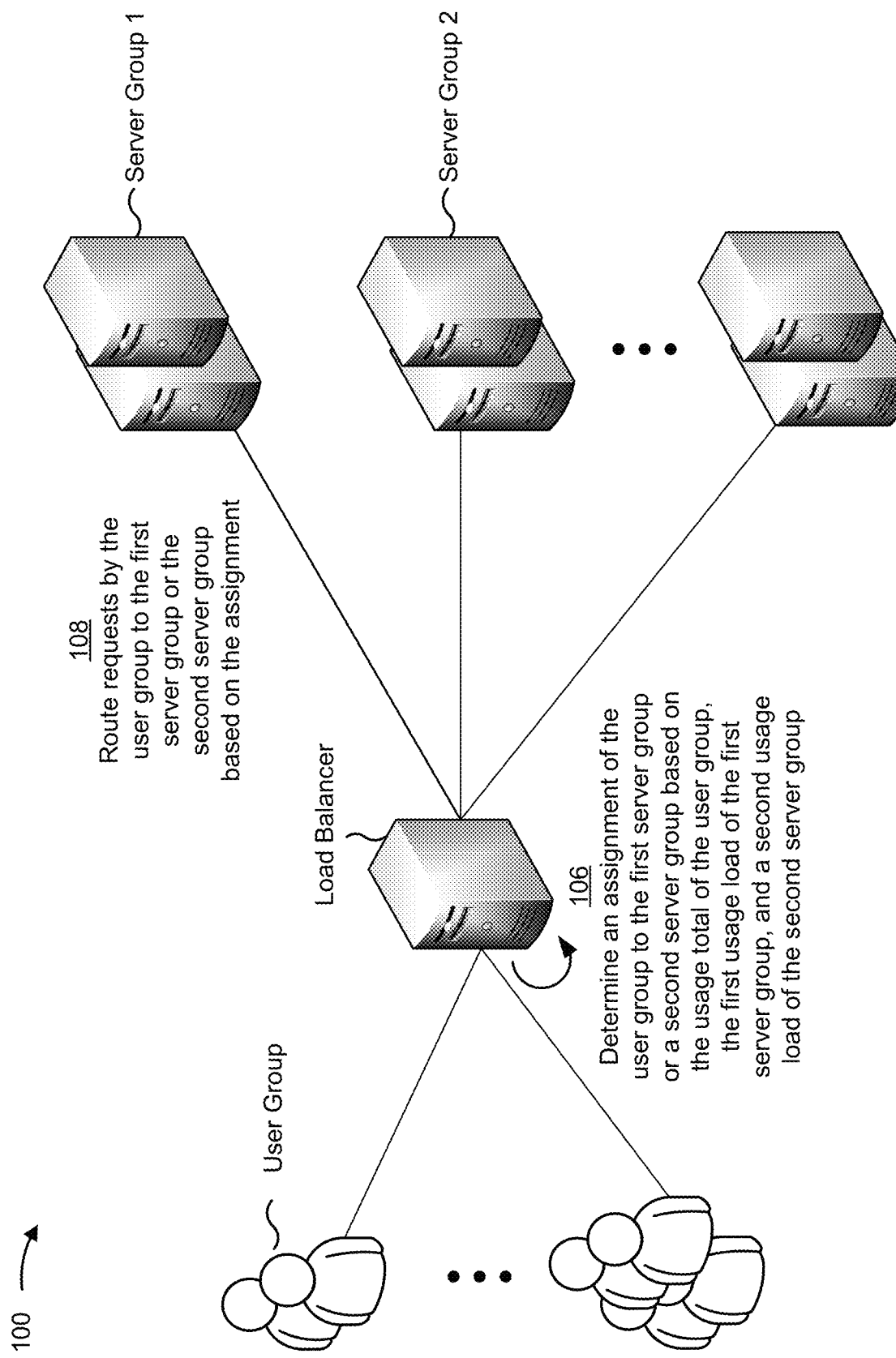

FIGS. 1A-1C are diagrams of one or more example implementations 100 described herein. As shown in FIGS. 1A-1C, example implementation(s) 100 can include a load balancer that receives incoming requests from a plurality of user groups and distributes the requests across a plurality of server groups. In some implementations, requests of a particular user group can be assigned to a particular server group. For example, a user group can make a request for a resource that is routed to a server group by the load balancer according to an assignment of the user group. The server group can process the request made by the user group and return the resource to the load balancer, which forwards the resource to the user group in response to the request.

In some implementations, the load balancer can be implemented by one or more processes associated with one or more server devices (e.g., a Domain Name System (DNS) server device, a reverse proxy server device, and/or the like) or one or more hardware devices (e.g., a multilayer switch). In some implementations, a server group can be a distributed computing system that employs a plurality of server devices, such as a server cluster (e.g., a high-availability server cluster), server devices of a data center, server devices of a cloud computing environment, or a server grid. The load balancer and the plurality of server groups can be associated with an entity (e.g., an entity that provides a web service (e.g., a representational state transfer (REST) web service, a simple object access protocol (SOAP) web service, and/or the like) or another application programming interface (API)).

In some implementations, the user groups can be customers (e.g., customers that produce variable traffic, such as a first customer associated with a single user, a second customer associated with 100 users, and a third customer associated with 1000 users) of the entity providing the web service. Additionally, a user device (e.g., a mobile phone, a smartphone, a laptop computer, a desktop computer, a tablet computer, an internet of things (IoT) device, a telematics device, and/or the like) of a customer can obtain one or more resources of the web service (e.g., webpage files, image files, data items, such as data items in an Extensible Markup Language (XML) format or a JavaScript Object Notation (JSON) format, and/or the like) by making one or more requests (e.g., API requests, also known as API calls) to the web service.

While the description to follow will be described in terms of an example of load balancing requests made by user groups that are processed by server groups, the description is not limited to this particular example. Implementations described herein also apply to load balancing requests made by individual users (e.g., a plurality of individual users that produce variable traffic) and/or requests that are processed by individual servers (e.g., a plurality of individual servers).

As shown in FIG. 1A, and by reference number 102, the load balancer, or another process and/or device that communicates with the load balancer (collectively referred to herein as the load balancer), can determine a historical usage load on a server group. In some implementations, the usage load can be determined from an aggregate usage of the server group over a time period (e.g., 1 hour, 1 day, 1 week, 1 month, etc.) by one or more user groups that are assigned to make requests via the server group (e.g., requests for one or more resources). In some implementations, the aggregate usage total can be a sum of usages, as described below, associated with the one or more user groups.

In some implementations, the server group can be one of a plurality of server groups. Accordingly, the load balancer can determine respective usage loads for the plurality of server groups. In this way, the load balancer can identify one or more server groups of the plurality of server groups that experience the highest usage loads (e.g., overworked server groups) and one or more server groups of the plurality of server groups that experience the lowest usage loads (e.g., underutilized server groups). For example, a server group can be classified as overworked where a usage load on the server group is not within a range associated with a usage load threshold (e.g., the usage load on the server group is greater than an upper bound of the range). As another example, a server group can be classified as underutilized where the usage load on the server group is not within the range associated with the usage load threshold (e.g., the usage load on the server group is less than a lower bound of the range). In this way, the load balancer can attempt to reduce a usage load on server groups classified as overworked and increase a usage load on server groups classified as underutilized to thereby balance a total usage load across the plurality of server groups.

In some implementations, a server group is a group of one or more interconnected server devices that share in the processing of requests. In some implementations, the load balancer can allocate requests designated for a server group across the server devices of the server group according to a random technique, a round-robin technique, an IP address hashing technique, a least connections technique, and/or the like.

In some implementations a server group is a subset of a total set of server devices associated with the load balancer. For example, a total set of server devices (e.g., servers A, B, C, and D) can have a first subset of server devices (e.g., servers A and B) forming a first server group and a second subset of server devices (e.g., servers C and D) forming a second server group. In this way, if a server device of a server group were to fail, requests can be routed to the unaffected server device of the server group, thereby improving the efficiency and reliability of processing requests. While FIG. 1A shows server groups having two server devices, this is intended simply as an example. In practice, a server group can have any number of server devices, and different server groups can have different numbers of server devices.

In some implementations, multiple server groups can have one or more server devices in common. For example, a first server group can be associated with a first plurality of server devices, a second server group can be associated with a second plurality of server devices, and the first plurality of server devices and the second plurality of server devices can have at least one server device in common. As another example, a total set of server devices (e.g., servers A, B, C, and D) can have a first subset of server devices (e.g., servers A and B) forming a first server group, a second subset of server devices (e.g., servers B and C) forming a second server group, and a third subset of server devices (e.g., servers C and D) forming a third server group. In this way, a large number of server groups can be formed from a relatively small number of server devices, thereby providing an opportunity to isolate user groups from one another to improve an overall reliability and stability of the server groups.

As shown by FIG. 1B, and by reference number 104, the load balancer can determine a historical usage total for a user group. In some implementations, the usage total can be determined from a usage of a server group by the user group over a time period (e.g., 1 hour, 1 day, 1 week, 1 month, etc.). In some implementations, the time period used to determine usage total and usage load, as described above, is the same.

In some implementations, the load balancer can determine the usage of the server group by the user group based on information relating to requests made by the user group over the time period. Thus, the load balancer and/or one or more server devices of a server group can store, or cause another device to store, information relating to a request made by a user group (e.g., information relating to a process duration of the request or information relating to a count of the request) to a data structure (e.g., a database, a linked list, a table, and/or the like). For example, upon receiving a request from a user group, the load balancer and/or a server device can store and/or update information relating to the request (e.g., the load balancer and/or the server device can generate a record in a data structure with information relating to the request, such as a time the request is received), and upon transmitting a response to the request, the load balancer and/or the server device can store and/or update information relating to the request (e.g., the load balancer and/or the server device can update the record in the database with information relating to the request, such as a time the response is transmitted). In some implementations, the load balancer can obtain one or more of the information from the data structure in connection with a load balancing operation. Additionally, or alternatively, the load balancer can generate data (e.g., a usage total) based on one or more of the information in the data structure in connection with a load balancing operation.

In some implementations, the usage of a user group can be based on a weighting of data (e.g., data generated by the load balancer based on one or more of the information in the data structure) relating to a process duration of requests made by a user group over a time period and/or data relating to a number of requests made by the user group over the time period. For example, the usage of a user group can be based on a weighting (e.g., a percentage from 0% to 100%) of one or more data chosen from: a total process duration associated with the user group over a time period (e.g., a total processing time associated with the user group over the time period, such as 1 week); a total number of requests associated with the user group over the time period; a total process duration associated with the user group over an interval of the time period that immediately precedes a load balancing operation (e.g., a total processing time associated with the user group over an interval, such as 1 day, that immediately precedes the load balancing operation); a total number of requests associated with the user group over the interval of the time period that immediately precedes the load balancing operation; a standard deviation in total process duration associated with the user group over a plurality of intervals of the time period (e.g., a standard deviation in total processing times associated with the user group over the plurality of intervals, such as a plurality of 1 day intervals); a standard deviation in total number of requests associated with the user group over the plurality of intervals of the time period; an average total process duration associated with the user group over the plurality of intervals of the time period (e.g., an average total processing time associated with the user group over the plurality of intervals, such as a plurality of 1 day intervals); or an average total number of requests associated with the user group over the plurality of intervals of the time period. In some implementations, any of the foregoing data can be based on a specific period of time, such as weekday usage only, weekend usage only, office hours (e.g., 8 am to 5 pm) usage only, overnight (e.g., 11 pm to 6 am) usage only, and/or the like.

In some implementations, the user group can be one of a plurality of user groups. Accordingly, the load balancer can determine respective usage totals for the plurality of user groups. In this way, the load balancer can identify one or more user groups of the plurality of user groups that produce the highest usage totals (e.g., heavy user groups) and one or more user groups of the plurality of user groups that produce the lowest usage totals (e.g., light user groups). For example, a user group can be classified as a heavy user group where a usage total of the user group satisfies a heavy user group threshold. As another example, a user group can be classified as a light user group where a usage total of the user group satisfies a light user group threshold. In this way, the load balancer can attempt to isolate user groups classified as a heavy user group from one another and attempt to assemble user groups classified as a light user group with one another to thereby improve stability and reliability of the plurality of server groups.

As shown in FIG. 1C, and by reference number 106, the load balancer can determine an assignment of a user group to a first server group or a second server group based on a usage total of the user group, a first usage load of the first server group, and/or a second usage load of the second server group. In some implementations, the load balancer can determine respective server group assignments for one or more of the plurality of user groups to thereby evenly distribute a total usage load across the plurality of server groups.

In some implementations, the load balancer can employ an iterative process to identify a user group to assign from a first server group to a second server group. In some implementations, prior to commencing the iterative process, the load balancer can determine server group assignments for heavy user groups to promote isolation of the heavy user groups. For example, the load balancer can determine assignments for heavy user groups so as to avoid assigning more than one heavy user group to a same server group. As another example, the load balancer can determine assignments for heavy user groups so as to avoid assigning a first heavy user group to a first server group and a second heavy user group to a second server group if the first server group and the second server group have a server device in common.

In some implementations, after determining assignments for heavy user groups, the load balancer can employ the iterative process to identify user groups that are suitable for reassignment until a total load on the plurality of server groups is evenly distributed (e.g., evenly distributed within a tolerance). In some implementations, according to the iterative process, the load balancer can select a server group as a recipient server group (e.g., a server group associated with a lowest usage load of the plurality of server groups) and perform a first iteration of a plurality of donor server groups (e.g., server groups with a higher usage load than the recipient server group) to identify a user group that satisfies first criteria. For example, the load balancer can perform the first iteration by searching for a user group that satisfies the first criteria in a first donor server group associated with a highest usage load of the plurality of server groups, followed by searching in a second donor server group associated with a next highest usage load of the plurality of server groups if a user group is not identified in the first server group, etc. In some implementations, such as where a user group that satisfies the first criteria is not identified in the first iteration, a second iteration of the plurality of donor server groups can be performed to identify a user group that satisfies second criteria. In some implementations, such as where a user group that satisfies the second criteria is not identified in the second iteration, a third iteration of the plurality of donor server groups can be performed to identify a user group that satisfies third criteria.

In some implementations, such as where no user group that satisfies one of the first criteria, the second criteria, or the third criteria is identified in an iteration of the plurality of donor server groups, the load balancer can select a different server group as the recipient server group (e.g., a server group associated with a next lowest usage load of the plurality of server groups, etc.), and repeat the iterative process with a new plurality of donor server groups (e.g., server groups with a higher usage load than the recipient server group newly selected) to identify a user group that satisfies one of the first criteria, the second criteria, or the third criteria.

When the load balancer identifies a user group to assign from a donor server group to a recipient server group (e.g., a user group that satisfies one of the first criteria, the second criteria, or the third criteria), the load balancer can determine an assignment of the user group to the recipient server group. In some implementations, the load balancer can record an assignment of the user group to the recipient server group based on determining an assignment of the user group to the recipient server group. Additionally, or alternatively, the load balancer can record a state of the iterative process that identifies respective assignments for the plurality of user groups based on determining the assignment of the user group to the recipient server group. In this way, the load balancer can revert to a previously recorded state if the load balancer is unable to identify a user group for reassignment during the iterative process. In some implementations, the load balancer can reinitialize the iterative process based on updated usage loads of the plurality of server groups resulting from the assignment of the user group to the recipient server group if the assignment does not result in a balanced load across all server groups (e.g., the load balancer can perform the first iteration of the iterative process based on a recipient server group that is a server group with a lowest updated usage load of the plurality of server groups).

In some implementations, according to the first criteria, the load balancer can identify a user group to assign from a first server group (e.g., a donor server group) to a second server group (e.g., a recipient server group) based on determining that the first server group has a greater usage load over a time period than the second server group (e.g., a first usage load of the first server group is greater than a second usage load of the second server group over the time period), a usage total of the user group is a highest usage total among a plurality of user groups assigned to the first server group, a usage load of the second server group over the time period, when increased by the usage total of the user group over the time period, is within a range associated with a usage load threshold (e.g., a sum of the usage load of the second server group over the time period and the usage total of the user group over the time period is within the range associated with the usage load threshold), and a usage load of the first server group over the time period, when decreased by the usage total of the user group over the time period, is within the range associated with the usage load threshold (e.g., a difference of the usage load of the first server group over the time period and the usage total of the user group over the time period is within the range associated with the usage load threshold).

In some implementations, according to the second criteria, the load balancer can identify a user group to assign from a first server group (e.g., a donor server group) to a second server group (e.g., a recipient server group) based on determining that the first server group has a greater usage load over a time period than the second server group (e.g., a first usage load of the first server group is greater than a second usage load of the second server group over the time period), a usage total of the user group is a highest usage total among a plurality of user groups assigned to the first server group, and a usage load of the second server group over the time period, when increased by the usage total of the user group over the time period, is within a range associated with a usage load threshold (e.g., a sum of the usage load of the second server group over the time period and the usage total of the user group over the time period is within the range associated with the usage load threshold).

In some implementations, according to the third criteria, the load balancer can identify a user group to assign from a first server group (e.g., a donor server group) to a second server group (e.g., a recipient server group) based on determining that the first server group has a greater usage load over a time period than the second server group (e.g., a first usage load of the first server group is greater than a second usage load of the second server group over the time period), and a usage total of the user group is a lowest usage total among a plurality of user groups assigned to the first server group.

In some implementations, the first criteria and/or the second criteria additionally can prescribe that a user group is not classified as a heavy user group. In some implementations, the first criteria and/or the second criteria additionally can prescribe that a first plurality of server devices of a first server group and a second plurality of server devices of a second server group do not have a server device in common. In some implementations, the first criteria and/or the second criteria additionally can prescribe that a usage total of a user group over a time period has a percentage change from one or more previous usage totals of the user group over one or more previous time period that satisfies a threshold value (e.g., a percentage change of ±10%, ±20%, ±50%, etc.). In some implementations, the first criteria, the second criteria, and/or the third criteria can additionally prescribe that an assignment of a user group from a first server group to a second server group does not result in a state of the iterative process that was previously recorded during the iterative process. In some implementations, the first criteria, the second criteria, and/or the third criteria can additionally prescribe that a user group has a usage total greater than zero over a time period (e.g., the user group made at least one request for a resource over the time period).

In some implementations, the load balancer can terminate the iterative process when respective usage loads of the plurality of server devices are within a range associated with a usage load threshold (e.g., greater than a lower bound of the range and less than an upper bound of the range, such as ±1%, ±5%, ±10%, etc. of the usage load threshold). In some implementations, the load balancer can determine a suitable usage load threshold based on historical usage load data. Additionally, or alternatively, the load balancer can be configured with the usage load threshold according to particular processing capabilities of a server group.

In some implementations, the load balancer can generate one or more records of user group assignments upon terminating the iterative process. For example, the load balancer can generate a record of user group assignments based on a last state of the iterative process prior to termination. As another example, the load balancer can generate a record of user group assignments based on assignments recorded during the iterative process.

As shown by reference number 108, the load balancer can route requests for one or more resources made by a user group according to an assignment of the user group determined from the iterative process. In some implementations, the load balancer can obtain one or more records of user group assignments from a data structure (e.g., a database, a linked list, a table, a flat file, and/or the like) and can route a request for a resource made by a user group according to an assignment of the user group contained in the one or more records. For example, the load balancer (e.g., a reverse proxy) can obtain a record (e.g., a flat file) containing user group assignments to determine a mapping of user groups and server groups.

In some implementations, after receiving a request for a resource, a server device of a server group can locate the resource requested and transmit the resource to the load balancer. The load balancer then can transmit the resource to a user device of a user of the user group that requested the resource.

In some implementations, the load balancer can perform a load balancing operation periodically (e.g., once a day, once a week, once a month, etc.) to account for changing usage and/or changing load that can result from seasonal usage, increasing needs of a user group, decreasing needs of a user group, one or more new user groups, one or more new server groups or new server devices, and/or the like. Additionally, or alternatively, the load balancer can perform a load balancing operation upon detecting an event. For example, the load balancer can perform a load balancing operation upon detecting a change (e.g., a percentage change from a previous interval) in usage of a user group that satisfies a threshold value or in load on a server group that satisfies a threshold value.

As indicated above, FIGS. 1A-1C are provided as an example. Other examples can differ from what is described with regard to FIGS. 1A-1C.

Figure 2:
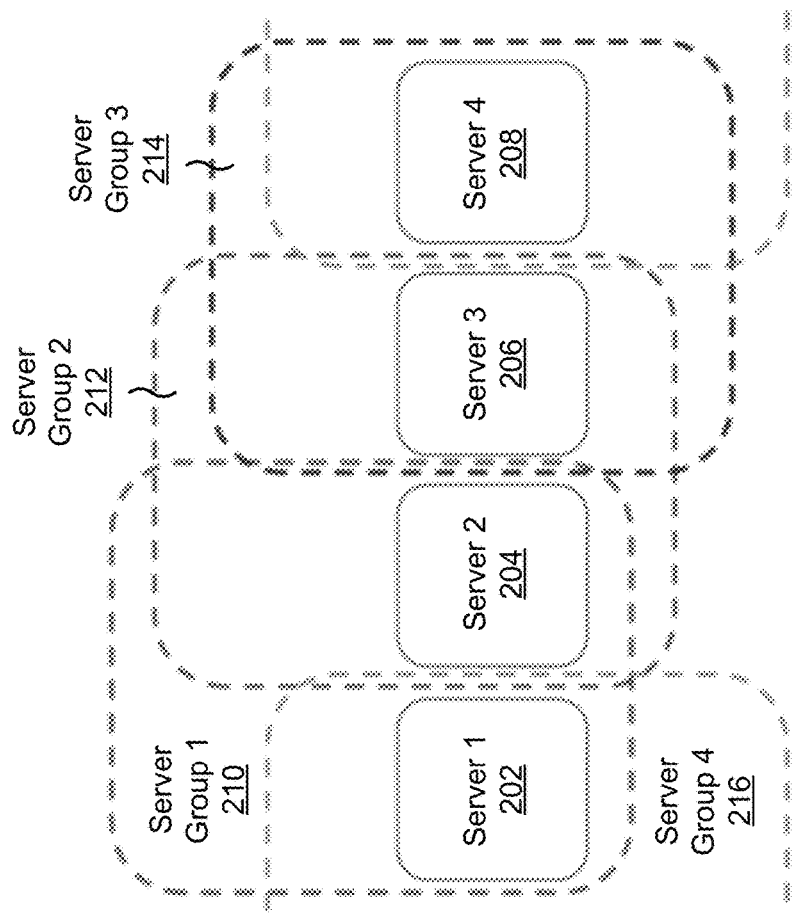
FIG. 2 is a diagram of an example implementation described herein.

FIG. 2 is a diagram of an example implementation 200 described herein. As shown in FIG. 2, a first server device (Server 1) 202, a second server device (Server 2) 204, a third server device (Server 3) 206, and a fourth server device (Server 4) 208 can be shared between a first server group (Server Group 1) 210, a second server group (Server Group 2) 212, a third server group (Server Group 3) 214, and a fourth server group (Server Group 4) 216. In some implementations, the first server device 202 is shared by the first server group 210 and the fourth server group 216, the second server device 204 is shared by the first server group 210 and the second server group 212, the third server device 206 is shared by the second server group 212 and the third server group 214, and the fourth server device 208 is shared by the third server group 214 and the fourth server group 216.

In this way, a large number of possible server groups can be formed from a relatively smaller number of server devices. For example, ten server devices can form 120 server groups of three server devices. Accordingly, user groups can be better isolated from one another, thereby improving the reliability and stability of server groups. As such, a user group that is making too many requests (e.g., a denial-of-service (DoS) attack) to a server group is isolated from user groups in other server groups. Thus, even if the user group causes a server device in a server group to fail, server groups that share the server device will not see an outage because those server groups also contain unaffected server devices that can continue processing requests. In some implementations, a number of server groups can be the same as a number of user groups such that a combination of server devices is not the same for any two user groups, thereby isolating all user groups from one another.

As indicated above, FIG. 2 is provided as an example. Other examples can differ from what is described with regard to FIG. 2.

Figure 3:
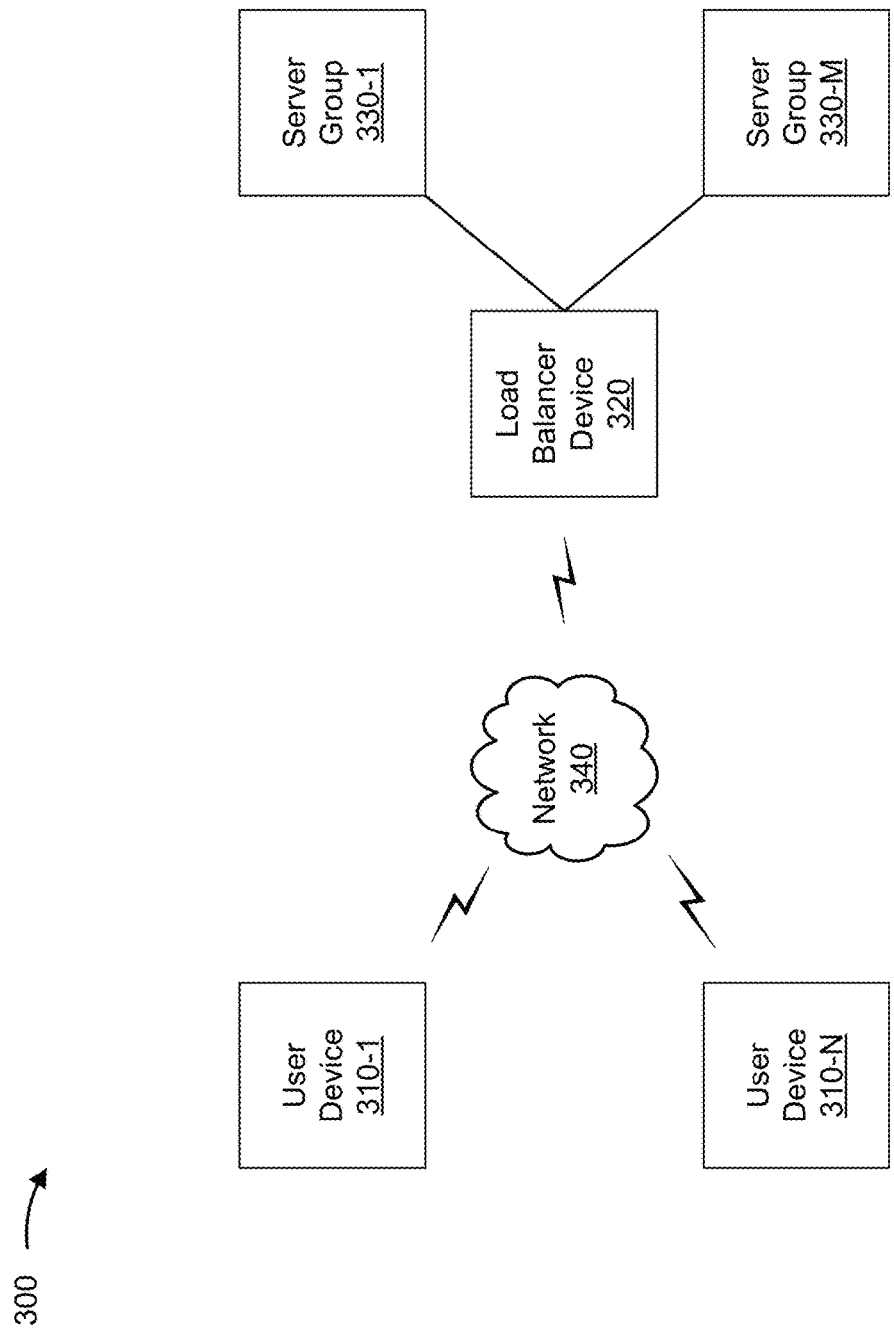
FIG. 3 is a diagram of an example environment in which systems and/or methods described herein can be implemented.

FIG. 3 is a diagram of an example environment 300 in which systems and/or methods, described herein, can be implemented. As shown in FIG. 3, environment 300 can include one or more user devices 310-1 through 310-N (N >1) (hereinafter referred to collectively as "user devices 310," and individually as "user device 310"), load balancer device 320, one or more server groups 330-1 through 330-M (M >1) (hereinafter referred to collectively as "server groups 330," and individually as "server group 330"), and network 340. Devices of environment 300 can interconnect via wired connections, wireless connections, or a combination of wired and wireless connections.

User device 310 includes one or more devices capable of receiving, generating, storing, processing, and/or providing information associated with requesting a resource. For example, user device 310 can include a communication and/or computing device, such as a mobile phone (e.g., a smartphone, a radiotelephone, etc.), a laptop computer, a desktop computer, a tablet computer, a handheld computer, a gaming device, a wearable communication device (e.g., a smart wristwatch, a pair of smart eyeglasses, etc.), an IoT device or smart appliance, a telematics device, or a similar type of device. A group of user devices 310 may be associated with a user group, as described herein.

Load balancer device 320 includes one or more devices capable of distributing incoming requests among server groups 330. For example, load balancer device 320 can include a computing device (e.g., a server device) capable of performing load balancing functions, as described herein.

Server group 330 includes one or more devices capable of receiving, generating, storing, processing, and/or providing information associated with a request for a resource. For example, server group 330 can include one or more computing devices, such as one or more server devices, associated with one or more resources. In some implementations, a first server group 330 may include a different number of computing devices than a second server group 330. In some implementations, a first server group 330 may include a same number of computing devices as a second server group 330. In some implementations, a first server group 330 may share at least one computing device with a second server group 330. In some implementations, a first server group 330 may include a different type of computing device than a second server group 330. In some implementations, server group 330 can receive information from, and/or transmit information to, user device 310 and/or load balancer device 320.

Network 340 includes one or more wired and/or wireless networks. For example, network 340 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as one or more examples. In practice, there can be additional devices and/or networks, fewer devices and/or networks, different devices and/or networks, or differently arranged devices and/or networks than those shown in FIG. 3. Furthermore, two or more devices shown in FIG. 3 can be implemented within a single device, or a single device shown in FIG. 3 can be implemented as multiple, distributed devices. Additionally, or alternatively, a set of devices (e.g., one or more devices) of environment 300 can perform one or more functions described as being performed by another set of devices of environment 300.

Figure 4:
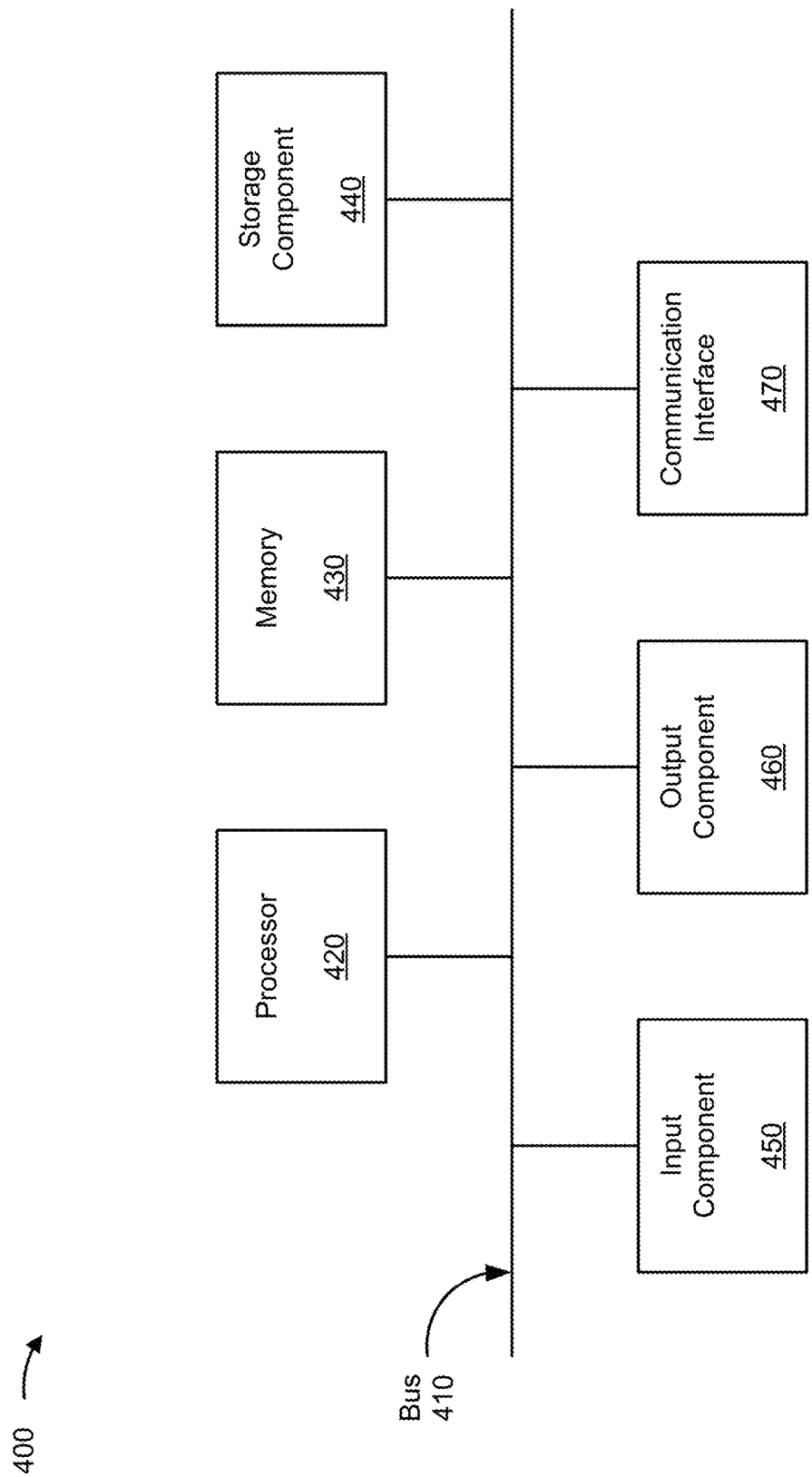
FIG. 4 is a diagram of example components of one or more devices of FIG. 3.

FIG. 4 is a diagram of example components of a device 400. Device 400 can correspond to a user device 310, load balancer device 320, and/or a server device of server group 330. In some implementations, user device 310, load balancer device 320, and/or a server device of server group 330 can include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a wireless local area network interface, a cellular network interface, and/or the like.

Device 400 can perform one or more processes described herein. Device 400 can perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

FIG. 5 is a flow chart of an example process 500 for usage-based server load balancing. In some implementations, one or more process blocks of FIG. 5 can be performed by a load balancer (e.g., load balancer device 320). In some implementations, one or more process blocks of FIG. 5 can be performed by another device or a group of devices separate from or including the load balancer, such as a user device (e.g., user device 310) and/or a server device (e.g., a server device of server group 330).

As shown in FIG. 5, process 500 can include determining a first usage load for a first server group, wherein the first server group is one of a plurality of server groups associated with a resource, wherein the first usage load is an aggregate usage total of the first server group over a time period by a plurality of user groups assigned to make requests for the resource via the first server group (block 510). For example, the load balancer (e.g., using processor 420, memory 430, storage component 440, input component 450, communication interface 470, and/or the like) can determine a first usage load for a first server group, as described above. In some implementations, the first server group can be one of a plurality of server groups associated with a resource. In some implementations, the first usage load can be an aggregate usage total of the first server group over a time period by a plurality of user groups assigned to make requests for the resource via the first server group.

As further shown in FIG. 5, process 500 can include determining a usage total for a user group of the plurality of user groups assigned to make requests for the resource via the first server group, wherein the usage total identifies a usage of the first server group by the user group over the time period (block 520). For example, the load balancer (e.g., using processor 420, memory 430, storage component 440, input component 450, communication interface 470, and/or the like) can determine a usage total for a user group of the plurality of user groups assigned to make requests for the resource via the first server group, as described above. In some implementations, the usage total can identify a usage of the first server group by the user group over the time period.

As further shown in FIG. 5, process 500 can include determining an assignment of the user group to make requests for the resource via the first server group or a second server group of the plurality of server groups based on the usage total of the user group, the first usage load of the first server group, and a second usage load of the second server group (block 530). For example, the load balancer (e.g., using processor 420, memory 430, storage component 440, input component 450, communication interface 470, and/or the like) can determine an assignment of the user group to make requests for the resource via the first server group or a second server group of the plurality of server groups based on the usage total of the user group, the first usage load of the first server group, and a second usage load of the second server group, as described above.

As further shown in FIG. 5, process 500 can include routing requests for the resource by the user group to the first server group or the second server group based on the assignment (block 540). For example, the load balancer (e.g., using processor 420, memory 430, storage component 440, input component 450, output component 460, communication interface 470, and/or the like) can route requests for the resource by the user group to the first server group or the second server group based on the assignment, as described above.

Process 500 can include additional implementations, such as any single implementation or any combination of implementations described below and/or in connection with one or more other processes described elsewhere herein.

In some implementations, the first server group can be associated with a first plurality of server devices and the second server group can be associated with a second plurality of server devices, where the first plurality of server devices and the second plurality of server devices have at least one server device in common. In some implementations, the first server group can be associated with a first plurality of server devices and the second server group can be associated with a second plurality of server devices, where the first plurality of server devices and the second plurality of server devices do not have a server device in common.

In some implementations, when determining the assignment of the user group to make requests for the resource via the first server group or the second server group, the load balancer can determine that the assignment of the user group to make requests for the resource is via the second server group based on determining that the first usage load is greater than the second usage load, the usage total for the user group is a highest usage total of the plurality of user groups, a sum of the second usage load and the usage total is within a range associated with a usage load threshold, and a difference of the first usage load and the usage total is within the range associated with the usage load threshold. In some implementations, when determining the assignment of the user group to make requests for the resource via the first server group or the second server group, the load balancer can determine that the assignment of the user group to make requests for the resource is via the second server group based on determining that the first usage load is greater than the second usage load, the usage total for the user group is a highest usage total of the plurality of user groups, and a sum of the second usage load and the usage total is within a range associated with a usage load threshold. In some implementations, when determining the assignment of the user group to make requests for the resource via the first server group or the second server group, the load balancer can determine that the assignment of the user group to make requests for the resource is via the second server group based on determining that the first usage load is greater than the second usage load and the usage total is a lowest usage total of the plurality of user groups.

In some implementations, the usage of the first server group by the user group over the time period can be a weighting of one or more of a first total processing time for requests of the user group over the time period, a first total number of requests by the user group over the time period, a second total processing time for requests of the user group over an interval of the time period, a second total number of requests by the user group over the interval of the time period, a standard deviation in total processing time for requests of the user group over a plurality of intervals of the time period, a standard deviation in total number of requests by the user group over the plurality of intervals of the time period, an average total processing time for requests of the user group over the plurality of intervals of the time period, or an average total number of requests by the user group over the plurality of intervals of the time period.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   determining, by a load balancer device, a first usage load for a first server group,
     wherein the first server group is one of a plurality of server groups associated with a resource,
     wherein the first usage load is an aggregate usage total of the first server group over a time period by a plurality of user groups assigned to make requests for the resource via the first server group;
   determining, by the load balancer device, a usage total for a user group of the plurality of user groups assigned to make requests for the resource via the first server group, wherein the usage total identifies a usage of the first
server group by the user group over the time period;
determining, by the load balancer device, an assignment
of the user group to make requests for the resource via
a second server group of the plurality of server groups
based on the first usage load being greater than a second
usage load of the second server group, the usage total
being a highest usage total of the plurality of user
groups, and a sum of the second usage load and the
usage total being within a range associated with a usage
load threshold; and
routing, by the load balancer device, requests for the
resource by the user group to the second server group
based on the assignment.

2. The method of claim 1, wherein the first server group is associated with a first plurality of server devices and the second server group is associated with a second plurality of server devices,
wherein the first plurality of server devices and the second plurality of server devices have at least one server device in common.

3. The method of claim 1, wherein the first server group is associated with a first plurality of server devices and the second server group is associated with a second plurality of server devices,
wherein the first plurality of server devices and the second plurality of server devices do not have a server device in common.

4. The method of claim 1, wherein determining the assignment of the user group to make requests for the resource via the first server group or the second server group comprises:
determining that the assignment of the user group to make requests for the resource is via the second server group further based on a difference of the first usage load and the usage total being within the range associated with the usage load threshold.

5. The method of claim 1, wherein the usage of the first server group by the user group over the time period is a weighting of one or more of:
a first total processing time for requests of the user group over the time period,
a first total number of requests by the user group over the time period,
a second total processing time for requests of the user group over an interval of the time period,
a second total number of requests by the user group over the interval of the time period,
a standard deviation in total processing time for requests of the user group over a plurality of intervals of the time period,
a standard deviation in total number of requests by the user group over the plurality of intervals of the time period,
an average total processing time for requests of the user group over the plurality of intervals of the time period, or
an average total number of requests by the user group over the plurality of intervals of the time period.

6. The method of claim 1, wherein determining the assignment of the user group to make requests for the resource via the second server group comprises:
determining the assignment of the user group to make requests for the resource the second server group by employing an iterative process; and
the method further comprising:
recording a state of the iterative process.

7. The method of claim 1, further comprising:
recording the assignment of the user group to make requests for the resource via the second server group.

8. A non-transitory computer-readable medium storing instructions, the instructions comprising:
one or more instructions that, when executed by one or more processors, cause the one or more processors to:
determine a first usage load for a first server group,
wherein the first server group is one of a plurality of server groups associated with a resource,
wherein the first usage load is an aggregate usage total of the first server group over a time period by a plurality of user groups assigned to make requests for the resource via the first server group;
determine a usage total for a user group of the plurality of user groups assigned to make requests for the resource via the first server group,
wherein the usage total identifies a usage of the first server group by the user group over the time period;
determine an assignment of the user group to make requests for the resource via a second server group of the plurality of server groups based on the first usage load being greater than a second usage load of the second server group, the usage total being a highest usage total of the plurality of user groups, and a sum of the second usage load and the usage total being within a range associated with a usage load threshold; and
route requests for the resource by the user group to the second server group based on the assignment.

9. The non-transitory computer-readable medium of claim 8, wherein the first server group is associated with a first plurality of server devices and the second server group is associated with a second plurality of server devices,
wherein the first plurality of server devices and the second plurality of server devices have at least one server device in common.

10. The non-transitory computer-readable medium of claim 8, wherein the first server group is associated with a first plurality of server devices and the second server group is associated with a second plurality of server devices,
wherein the first plurality of server devices and the second plurality of server devices do not have a server device in common.

11. The non-transitory computer-readable medium of claim 8, wherein the one or more instructions, that cause the one or more processors to determine the assignment of the user group to make requests for the resource via the first server group or the second server group, cause the one or more processors to:
determine that the assignment of the user group to make requests for the resource is via the second server group further based on a difference of the first usage load and the usage total being within the range associated with the usage load threshold.

12. The non-transitory computer-readable medium of claim 8, wherein the usage of the first server group by the user group over the time period is a weighting of one or more of:
a first total processing time for requests of the user group over the time period,
a first total number of requests by the user group over the time period,
a second total processing time for requests of the user group over an interval of the time period, a second total number of requests by the user group over the interval of the time period, a standard deviation in total processing time for requests of the user group over a plurality of intervals of the time period, a standard deviation in total number of requests by the user group over the plurality of intervals of the time period, an average total processing time for requests of the user group over the plurality of intervals of the time period, or an average total number of requests by the user group over the plurality of intervals of the time period.

13. The non-transitory computer-readable medium of claim 8, wherein the one or more instructions, that cause the one or more processors to determine the assignment of the user group to make requests for the resource via the second server group, cause the one or more processors to:

determine the assignment of the user group to make requests for the resource via the second server group by employing an iterative process; and wherein the one or more instructions, when executed by the one or more processors, further cause the one or more processors to:

record a state of the iterative process.

14. The non-transitory computer-readable medium of claim 8, wherein the one or more instructions, when executed by the one or more processors, further cause the one or more processors to:

record the assignment of the user group to make requests for the resource via the second server group.

15. A load balancer device, comprising:

one or more memories; and one or more processors, communicatively coupled to the one or more memories, to:

determine a first usage load for a first server group, wherein the first server group is one of a plurality of server groups associated with a resource, wherein the first usage load is an aggregate usage total of the first server group over a time period by a plurality of user groups assigned to make requests for the resource via the first server group;

determine a usage total for a user group of the plurality of user groups assigned to make requests for the resource via the first server group, wherein the usage total identifies a usage of the first server group by the user group over the time period;

determine an assignment of the user group to make requests for the resource via a second server group of the plurality of server groups based on the first usage load being greater than a second usage load of the second server group, the usage total being a highest usage total of the plurality of user groups, and a sum of the second usage load and the usage total being within a range associated with a usage load threshold; and route requests for the resource by the user group to the second server group based on the assignment.

16. The load balancer device of claim 15, wherein the first server group is associated with a first plurality of server devices and the second server group is associated with a second plurality of server devices, wherein the first plurality of server devices and the second plurality of server devices have at least one server device in common.

17. The load balancer device of claim 15, wherein the first server group is associated with a first plurality of server devices and the second server group is associated with a second plurality of server devices, wherein the first plurality of server devices and the second plurality of server devices do not have a server device in common.

18. The load balancer device of claim 15, wherein the one or more processors, when determining the assignment of the user group to make requests for the resource via the first server group or the second server group, are to:

determine that the assignment of the user group to make requests for the resource is via the second server group is further based on a difference of the first usage load and the usage total being within the range associated with the usage load threshold.

19. The load balancer device of claim 15, wherein the one or more processors, when determining the assignment of the user group to make requests for the resource via the second server group, are to:

determine the assignment of the user group to make requests for the resource via the second server group by employing an iterative process; and wherein the one or more processors are further to:

record a state of the iterative process.

20. The load balancer device of claim 15, wherein the one or more processors are further to:

record the assignment of the user group to make requests for the resource via the second server group.

\* \* \* \* \*